US011914683B2

(12) United States Patent
Boyapalle et al.

(10) Patent No.: US 11,914,683 B2
(45) Date of Patent: Feb. 27, 2024

(54) SYSTEMS AND METHODS TO TRANSFER SOFTWARE ENTITLEMENTS BETWEEN INFORMATION HANDLING SYSTEMS

(71) Applicant: DELL PRODUCTS L.P., Round Rock, TX (US)

(72) Inventors: Anantha K. Boyapalle, Cedar Park, TX (US); Charles D. Robison, Buford, GA (US); Vaibhav Soni, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 283 days.

(21) Appl. No.: 17/393,952

(22) Filed: Aug. 4, 2021

(65) Prior Publication Data

US 2023/0044720 A1     Feb. 9, 2023

(51) Int. Cl.
*G06F 21/10*     (2013.01)
*H04L 9/40*     (2022.01)

(52) U.S. Cl.
CPC ........ *G06F 21/105* (2013.01); *H04L 63/0876* (2013.01); *G06F 21/1085* (2023.08)

(58) Field of Classification Search
CPC ........... G06F 21/105; G06F 2221/0788; H04L 63/0876

(Continued)

(56) References Cited

U.S. PATENT DOCUMENTS 11,074,322 B1 * 7/2021 R .......................... G06F 21/105

2005/0005114 A1 * 1/2005 Medvinsky ........... H04L 9/3213
713/168

(Continued)

FOREIGN PATENT DOCUMENTS

| CN | 106971094 A | * | 7/2017 | ........... G06F 21/121 |
| WO | WO-2005079311 A2 | * | 9/2005 | ....... G06F 17/30176 |

OTHER PUBLICATIONS

Kamperman et al., "Marlin Common Domain: Authorized Domains in Marlin technology," 2007 4th IEEE Consumer Communications and Networking Conference, Las Vegas, Nv, USA, 2007, pp. 935-939, doi: 10.1109/CCNC.2007.189. (Year: 2007).*

(Continued)

*Primary Examiner* — Peter C Shaw
(74) *Attorney, Agent, or Firm* — Egan, Enders & Huston LLP.

(57) ABSTRACT

Embodiments of systems and computer implemented methods are provided to transfer software licenses and entitlements associated with a user account from a first information handling system (IHS) to a second IHS. A computer implemented method in accordance with the present disclosure may generally include executing an entitlement management service to reassign the software licenses and entitlements associated with the user account to the second IHS, executing at least one local validation service on the second IHS to validate the second IHS and the user's workspace, and if the second IHS and the user's workspace is successfully validated by the at least one local validation service, executing one or more cloud-based orchestration services to verify the user account, determine which software licenses and entitlements are associated with the user account, and acquire and validate the software licenses and entitlements before transferring the software licenses and entitlements to the second IHS.

26 Claims, 5 Drawing Sheets

(58) Field of Classification Search
USPC .............................................................. 726/4
See application file for complete search history.

(56) References Cited

U.S. PATENT DOCUMENTS

| | | | | |
|---|---|---|---|---|
| 2007/0055887 | A1* | 3/2007 | Cross .................... | H04L 9/3231 |
| | | | | 713/185 |
| 2007/0204078 | A1* | 8/2007 | Boccon-Gibod ....... | G06F 21/62 |
| | | | | 710/54 |
| 2017/0185981 | A1* | 6/2017 | Emmerson ........... | G10H 1/0058 |
| 2019/0362055 | A1* | 11/2019 | Rao ......................... | G06F 21/10 |

OTHER PUBLICATIONS

Keoh, "Marlin: toward seamless content sharing and rights management," in IEEE Communications Magazine, vol. 49, No. 11, pp. 174-180, Nov. 2011, doi: 10.1109/MCOM.2011.6069726. (Year: 2011).*

Joshi et al., "Towards practical privacy-preserving digital rights management for cloud computing," 2013 IEEE 10th Consumer Communications and Networking Conference (CCNC), Las Vegas, NV, USA, 2013, pp. 265-270, doi: 10.1109/CCNC.2013.6488456. (Year: 2013).*

Huang et al., "Secure File Sharing Scheme for Mobile Devices", 2013 4th International Conference on Networking and Distributive Computing, 2014 IEEE, pp. 82-84. (Year: 2014).*

Katsaros et al., "Service oriented license providing," 2009 IEEE International Conference on Service-Oriented Computing and Applications (SOCA), Taipei, Taiwan, 2009, pp. 1-5, doi: 10.1109/SOCA.2009.5410462. (Year: 2009).*

Cai et al., "Research and Application of the Floating License Management Strategy," 2009 First International Conference on Information Science and Engineering, Nanjing, China, 2009, pp. 1797-1800, doi: 10.1109/ICISE.2009.889. (Year: 2009).*

Jana et al., "Efficient management of privacy issues in mobile cloud environment," 2015 IEEE International Advance Computing Conference (IACC), Banglore, India, 2015, pp. 481-486, doi: 10.1109/IADCC.2015.7154755. (Year: 2015).*

Whalley et al., "Licence-aware management of virtual machines," 12th IFIP/IEEE International Symposium on Integrated Network Management (IM 2011) and Workshops, Dublin, Ireland, 2011, pp. 169-176, doi: 10.1109/INM.2011.5990688. (Year: 2011).*

Kao et al., "Automatic Adding License Management Functionality for Android Applications," 2013 Eighth Asia Joint Conference on Information Security, Seoul, Korea (South), 2013, pp. 122-126, doi: 10.1109/ASIAJCIS.2013.26. (Year: 2013).*

Mampaey et al., "A network-centric DRM for online scenarios," in Bell Labs Technical Journal, vol. 17, No. 3, pp. 129-133, Dec. 2012, doi: 10.1002/bltj.21563. (Year: 2012).*

Microsoft Docs, "OEM Activation 3.0 System", May 21, 2021, 3 pgs.

Microsoft, "Subscriptions, licenses, accounts, and tenants for Microsoft's cloud offerings", Captured from Internet Apr. 28, 2021, 9 pgs.

Moorehead, "Dell Upgrades PCs-As-A-Service Program", Nov. 2, 2017, 8 pgs.

Microsoft, "OA 3.0 Tool: Command-line And Config File Syntax", Jul. 29, 2021, 8 pgs Insight.com, "PC-As-A-Servrice Or Managed Device Services? The Difference Matters", Spring 2019, 8 pgs.

Dell Technologies, "Dell EMC Secured Component Verification Reference Guide For Servers", Rev. A00, Oct. 2020, 14 pgs.

\* cited by examiner

SYSTEMS AND METHODS TO TRANSFER SOFTWARE ENTITLEMENTS BETWEEN INFORMATION HANDLING SYSTEMS

FIELD

This invention relates generally to information handling systems and, more particularly, to systems and methods to transfer software entitlements from one information handling system to another.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Product registration enables users to take ownership of a new information handling system by ensuring warranties are connected to the user and ensuring that entitlements for licenses, services and contracts persist for the user regardless of the state of their device. Original equipment manufacturers (OEMs) provide a means for registering products purchased directly from the OEM (e.g., by providing mail-in and/or online product registration). During the product registration process, an information handling system purchased from the OEM may be associated with the user's account, along with various entitlements for licenses, services and contracts provided with and/or purchased for the information handling system. However, users who purchase information handling systems through other means (e.g., resellers) are not able to register or associate their system or entitlements with an OEM user account.

Software entitlements control what software keys get created to unlock new software applications, services and/or features. They validate which users can receive updates or support, and can be used to record which users have installed what software on what devices. When a new device, software application or service is activated, software entitlements are updated with device and user details, software keys and dates. Determining which users have what, how much they have and when they can use it is important in the centralization of entitlement management.

Entitlement management is the process of securing, distributing and validating entitlements across multiple systems and users within an organization. Entitlement management offers safety and compliance to organizations by serving a key role in the authentication, authorization and access control application security model. For example, when an organization purchases a software license, which grants the right to use a number of seats of a software product, entitlement management ensures that the rights defined in the software license are properly utilized by specifying the systems and users to which the licensed seats are assigned.

Asset managers, information technology (IT) managers and/or other administrators (hereinafter collectively referred to as "Admins") may use entitlement management systems to track and manage entitlements across multiple systems and users within an organization. When a new user/information handling system is added, the Admin may create a new account within the entitlement management system, purchase new licenses for software products (e.g., Microsoft Office 365, Miro, Zoom, Adobe, etc.) if need be, and manually assign the licenses and entitlements on the new system for that user. In most cases, licenses and entitlements are tied to an information handling system, which is associated with a user. If the user loses/damages their system, requests a new system or leaves the organization, the Admin may update the entitlement management system to revoke access to the entitlements on the user's system. In some cases, the Admin may use the entitlement management system to transfer entitlements from the user's old system to a new system, or to a new user. Unfortunately, the transfer of entitlements between users and devices (if even allowed) is currently a manual process, which adds to the overhead for managing the pool of available licenses. Because conventional entitlement management systems rely on a manual entitlement transfer process, they do not scale well to PC-as-a-service (PCaaS) models, in which the system (i.e., the PC) is replaceable, but the user's workspace and entitlements are not.

A need, therefore, exists for an improved system and method for transferring software entitlements from one information handling system to another.

SUMMARY

The following description of various embodiments of systems and related methods is not to be construed in any way as limiting the subject matter of the appended claims.

Embodiments of systems and methods are provided herein to transfer software licenses and entitlements from one information handling system (IHS) to another. In the disclosed embodiments, software licenses and entitlements are linked to a user's account and are semi-static to the user's IHS and workspace. As used herein, a workspace includes various user applications and services (i.e., the user's workload) that are executed to perform tasks for a user. In some embodiments, a workspace may further include storage, backend services, and associated policies and security needed to run the user's workload. A workspace can be transferred from one system to another. For example, a workspace may be configured to run within a container, which can be transferred from one system to another. By linking software licenses and entitlements to the user's account, the embodiments disclosed herein enable software licenses and entitlements to be transferred along with the user's workspace to a new information handling system, if the user loses/damages their system, requests a new system brings their own system, etc. If the user leaves the organization, or a new user is added, the disclosed embodiments may also be used to transfer software licenses and entitlements to a new user account.

Unlike conventional entitlement management systems and methods, which transfer software licenses and entitlements between systems/users manually, the embodiments disclosed herein provide an automated and secure system and method for transferring software licenses and entitlements from one IHS to another. When a need arises to transfer software licenses and entitlements to a new IHS or a new workspace (e.g., if the user loses/damages their system, requests a new system, brings their own system, leaves the organization, etc., or if the user's workspace is corrupted or otherwise unavailable), the system and methods disclosed herein automatically execute validation service(s) locally on the new system when the new system is booted for the first time to validate the new system and the user's workspace. If local validation is successful, the disclosed system and methods execute one or more cloud-based orchestration services to verify the user account associated with the user, determine which software licenses and entitlements are assigned to the user account, and acquire and validate the software licenses and entitlements before validated software licenses and entitlements are transferred to the new system. By validating the new system and the user's workspace on the new system platform, and verifying the user account and validating the software licenses assigned to the user account remotely, the system and methods disclosed herein provide a secure method to automatically transfer software licenses and entitlements from one IHS to another. This reduces the overhead (e.g., cost, time, etc.) involved in managing a pool of licenses, and is easily applied to PC-as-a-service (PCaaS) models, in which the system (i.e., the PC) is replaceable, but the user's workspace and entitlements are not.

According to one embodiment, a computer implemented method is provided herein for transferring software licenses and entitlements associated with a user account from a first information handling system (IHS) to a second IHS. In some embodiments, the computer-implemented method may begin by: executing an entitlement management service to reassign the software licenses and entitlements associated with the user account to the second IHS; and executing at least one local validation service on the second IHS when a user of the second IHS logs on to the second IHS for the first time (e.g., by providing a user ID to the second IHS) to validate the second IHS and the user's workspace. In some embodiments, the at least one local validation service may verify a device ID associated with the second IHS to validate the second IHS, and may verify that a container ID corresponding to the user's workspace is linked to the user ID to validate the user's workspace.

If the second IHS and the user's workspace is successfully validated by the at least one local validation service, the computer implemented method may further include executing one or more cloud-based orchestration services to verify the user account, determine which software licenses and entitlements are associated with the user account, acquire and validate the software licenses and entitlements, and transfer the software licenses and entitlements to the second IHS only if the user account is successfully verified and the software licenses and entitlements are successfully validated by the one or more cloud-based orchestration services. In some embodiments, the one or more cloud-based orchestration services may utilize the user ID to verify the user account and determine which software licenses and entitlements are associated with the user account.

In some embodiments, the computer-implemented method may further include executing the entitlement management service to place license keys associated with the software licenses and entitlements in a quarantined state prior to executing the at least one local validation service. If the second IHS and the user's workspace is successfully validated by the at least one local validation service, the at least one local validation service may be further executed to provide a device ID associated with the second IHS, a user ID corresponding to the user and a container ID corresponding to the user's workspace to the one or more cloud-based orchestration services. If the user account is successfully verified and the software licenses and entitlements are successfully validated by the one or more cloud-based orchestration services, the one or more cloud-based orchestration services may be further executed to embed the license keys, the device ID, the user ID and the container ID within an authorization token, which may be provided by the one or more cloud-based orchestration services to the second IHS for entitlement verification. In some embodiments, the computer-implemented method may further include using the authorization token to verify entitlement before transferring the software licenses and entitlements to the second IHS.

According to another embodiment, a system is provided herein for transferring software licenses and entitlements associated with a user account from a first information handling system (IHS) to a second IHS. The system described herein may generally include an administrator IHS, the second IHS and an orchestration server, all of which are communicatively coupled via a network. The administrator IHS includes a first processing device, which may be configured to execute an entitlement management service to reassign the software licenses and entitlements associated with the user account to the second IHS.

The second IHS includes a computer readable storage device for storing an operating system (OS) and at least one OS service, and a second processing device for executing the at least one OS service when a user of the second IHS logs on to the second IHS for the first time (e.g., by providing a user ID to the second IHS) to validate the second IHS and the user's workspace. In some embodiments, the at least one OS service executed by the second processing device may validate the second IHS by verifying a device ID associated with the second IHS, and may validate the user's workspace by verifying that a container ID corresponding to the user's workspace is linked to the user ID.

The orchestration server includes a computer readable storage device for storing one or more cloud-based orchestration services, and a third processing device for executing the one or more cloud-based orchestration services only if the second IHS and the user's workspace is successfully validated by the at least one local validation service. In some embodiments, the one or more cloud-based orchestration services may be executed by the third processing device to verify the user account, determine which software licenses and entitlements are associated with the user account, acquire and validate the software licenses and entitlements, and transfer the software licenses and entitlements to the second IHS only if the user account is successfully verified and the software licenses and entitlements are successfully validated by the one or more cloud-based orchestration services. In some embodiments, the one or more cloud-based orchestration services may utilize the user ID to verify the user account and determine which software licenses and entitlements are associated with the user account.

In some embodiments, the entitlement management service may be further executed by the first processing device to place license keys associated with the software licenses and entitlements in a quarantined state before the second processing device executes the at least one OS service. If the at least one OS service successfully validates the second IHS and the user's workspace, the at least one OS service may be further executed by the second processing device to provide a device ID associated with the second IHS, a user ID corresponding to the user and a container ID corresponding to the user's workspace to the one or more cloud-based orchestration services. If the user account is successfully verified and the software licenses and entitlements are successfully validated by the one or more cloud-based orchestration services, the one or more cloud-based orchestration services may be further executed by the third processing device to embed the license keys, the device ID, the user ID and the container ID within an authorization token, which may be provided to the second IHS for entitlement verification. In some embodiments, the second IHS may utilize the authorization token to verify entitlement with an entitlement service before the one or more cloud-based orchestration services transfer the software licenses and entitlements to the second IHS.

In some embodiments, the system may further include a backend server, which is communicatively coupled to the administrator IHS, the second IHS and the orchestration server via the network. In some embodiments, the at least one OS service may be executed by the second processing device to provide the device ID, the user ID and the container ID to the backend server for storage within an entitlement database contained within the backend server. In addition, the one or more cloud-based orchestration services may be executed by the third processing device to provide the license keys, the device ID, the user ID and the container ID to the backend server for storage within the entitlement database. Storing the license keys, the device ID, the user ID and the container ID within the entitlement database binds the entitlements to the second IHS and prevents other information handling systems from using the authorization token to gain access to the software licenses and entitlements being transferred to the second IHS.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Figure 1:
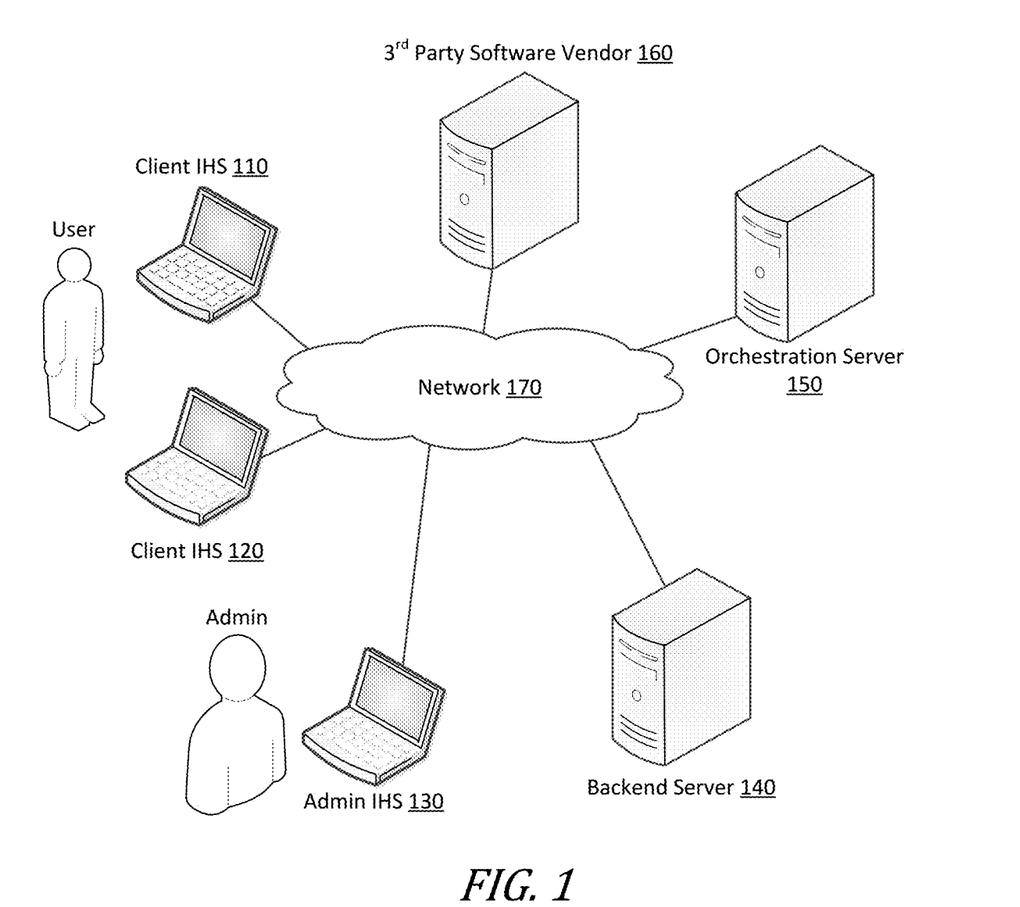
FIG. 1 is a schematic diagram of a system that may be used to transfer software licenses and entitlements from a first information handling system (IHS) to a second IHS, in accordance with one embodiment of the present disclosure.
Figure 2:
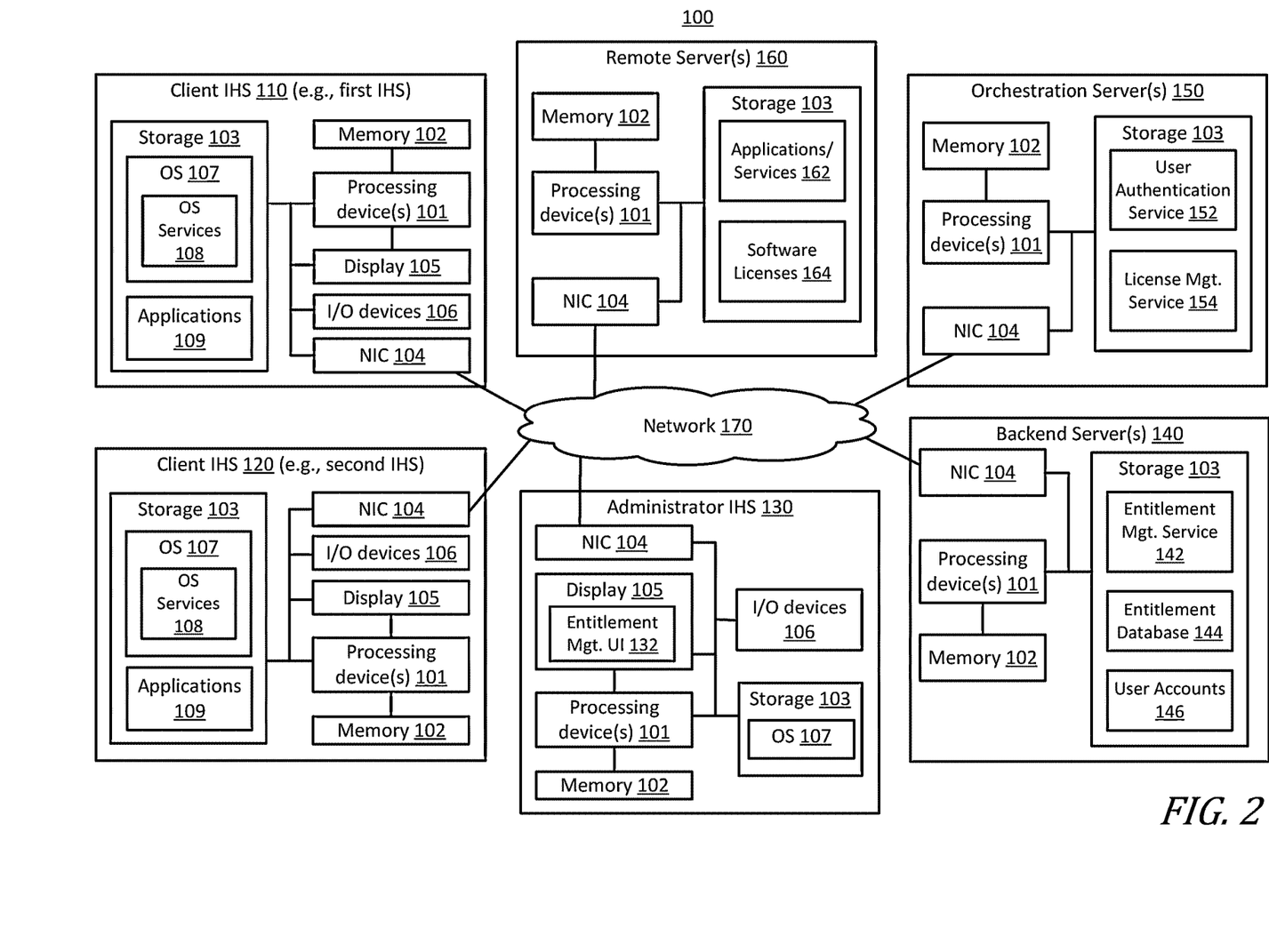
FIG. 2 is a block diagram illustrating details of the system components shown in FIG. 1.

FIGS. 1 and 2 illustrate one embodiment of a system 100 that may be used to transfer software licenses and entitlements from one IHS to another in accordance with the present disclosure. In the example embodiment shown in FIGS. 1-2, system 100 includes a first client IHS 110, a second client IHS 120, an administrator ("Admin") IHS 130, at least one backend server 140, at least one orchestration server 150 and at least one remote server 160, all of which are communicatively coupled (e.g., via TCP/IP or Internet protocol) with each other across a network 160, such as the Internet.

It is expressly noted that the system 100 shown in FIGS. 1 and 2 is exemplary only, and that the systems and methods disclosed herein may be implemented within any system architecture that enables the various information handling systems 110, 120, 130, 140, 150 and 160 described herein to communicate via one or more networks and/or one or more network communication protocols. It is further noted that the information handling systems 110, 120, 130, 140, 150 and 160 shown in FIGS. 1 and 2 are also exemplary. Although certain components of the information handling systems 110, 120, 130, 140, 150 and 160 are shown in FIG. 2 for illustrating embodiments of the present disclosure, the information handling systems disclosed herein are not restricted to including only those components shown in FIG. 2 and described below.

As shown in FIG. 2, each information handling system 110, 120, 130, 140, 150 and 160 may generally include at least one host processing device 101 (e.g., AMD or Intel-based CPU or any other type of suitable host processing device), at least one computer readable memory 102 (e.g., RAM, ROM, Flash, etc.) and at least one computer readable storage device 103 (e.g., one or more hard drives (HDDs), solid state drives (SSDs), etc.). In addition, each information handling system 110, 120, 130, 140, 150 and 160 may further include a network interface controller (NIC) 104 that is communicatively coupled to the network 170 to allow various components of the systems 110, 120, 130, 140, 150 and 160 to communicate through NIC 104 with each other and other information handling systems across the network 170.

Client systems 110 and 120 are information handling systems that are operated by and generally associated with a user. Client systems 110 and 120 may comprise a wide variety of different types of information handling systems, such as personal computers (e.g., desktop computers, laptop computers, etc.), tablet computers, mobile devices (e.g., smart phones), and other types of information handling systems, which are capable of executing a user's workload. The user's workload may include a wide variety of user applications and services. The user applications and services included within the user's workload may be stored and executed locally on the client system, and/or may be stored and executed remotely on a remote server (such as, e.g., remote server 160), which is accessed by the client system 110/120 via the network 170.

Client systems 110 and 120 may include additional hardware and software components in addition to the hardware components mentioned above. For example, client systems 110 and 120 may include a display device 105 for displaying information to a user (e.g., LCD or LED device) and/or for receiving user input from a user (e.g., LCD or LED touchscreen device). The display device 105 may be coupled to one or more buses (not shown) or may be coupled directly to the host processing device 101 (as shown), depending on the particular configuration of a given system. Client systems 110 and 120 may also include various input/output (I/O) devices 106 (e.g., a mouse, keyboard, touchpad, camera, biometric devices, etc.) for receiving input from a user. For example, a user may utilize one or more of the I/O devices 106 to provide login credentials (e.g., a user ID, password, passcode, biometric identifier, etc.) to the client system 110/120. The client systems 110 and 120 may also include other hardware/software components, as is known in the art.

In addition to hardware components, client systems 110 and 120 may include a variety of software components, which may be stored within the at least one computer readable storage 103 and executed by the host processing device 101. For example, the client systems 110 and 120 may include an operating system (OS) 107, one or more user applications 109 and user data. OS 107 and user applications 109 may contain program instructions, which are executed by the host processing device 101 to perform various tasks and functions for the client systems 110 and 120 and/or for the user.

User applications 109 may include a wide variety of OS applications that are stored within the at least one computer readable storage 103 and executed by the host processing device 101 locally on the client system 110/120. For example, user applications 109 may include local instances of Microsoft Office applications (e.g., Microsoft Word, Excel, Power Point, etc.), meeting applications (e.g., Zoom, Microsoft Teams, Skype, etc.), collaboration applications (e.g., Miro, Slack, etc.), design applications (e.g., Adobe Photoshop, Autodesk, etc.) and others. It will be understood that user applications 109 are not strictly limited to the example applications mentioned herein and may include substantially any other user applications and services, which are stored and executed locally on the client system 110/120.

User applications 109 may be used to perform tasks for the user, and thus, may form at least a part of the user's workload. In some cases, the user's workload may also include cloud-based applications and services 162. Unlike user applications 109, cloud-based applications and services 162 are stored and executed remotely on the remote server(s) 160 and accessed by the client systems 110/120 via the network 170. Examples of cloud-based applications and services 162 include, but are not limited to, cloud instances of Microsoft Office 365 applications (e.g., Microsoft Word, Excel, Power Point, etc.), cloud meeting applications (e.g., Zoom, Microsoft Teams, Skype, etc.), cloud collaboration applications (e.g., Miro, Slack, etc.), cloud design applications (e.g., Adobe Creative Cloud, Autodesk cloud services, etc.) and others. In some cases, cloud-based applications and services 162 may include cloud instances of enterprise applications for its users, including but not limited to, manageability services, security services, etc.

Software licenses and entitlements may be required for a user to access and utilize one or more of the user applications 109 and cloud-based applications and services 162. As known in the art, a software license grants the right to use a number of seats of a particular software product and includes terms and conditions that define how that software product may be legally used. A software entitlement, on the other hand, ensures that the rights defined in a software license are properly utilized by assigning the rights (or licensed seats) of a software license.

In conventional systems and methods, software licenses and entitlements are assigned to specific information handling systems/users and are manually transferred from one IHS to another. This increases the overhead (e.g., cost, time, etc.) involved in managing a pool of licenses and makes it tedious (if transfer is even allowed) to transfer software licenses and entitlements in a PCaaS environment, in which the system (i.e., the PC) is replaceable, but the user's workspace and entitlements are not. The present disclosure overcomes these disadvantages by assigning software licenses and entitlements to user accounts, not specific machines, and by providing secure systems and methods to automatically transfer software licenses and entitlements from one IHS to another when the need arises.

Admin IHS 130 is an information handling system used by an asset manager, IT manager and/or administrator of an organization (hereinafter referred to as an "Admin") to manage a plurality of hardware and software assets including, but not limited to, client systems 110 and 120, user applications 109 and cloud-based applications and services 162. As described in more detail below, the Admin may utilize an entitlement management service to assign software licenses and entitlements to a plurality of user accounts 146. When a new client system 110/120, user application 109 or cloud-based application or service 162 is activated for a particular user account, the entitlement management service may update the software entitlements assigned to the user account with device and user details, software keys and dates.

In some embodiments, an Admin may use an entitlement management user interface (UI) 132 and an entitlement management service 142 to track and manage software licenses and entitlements across multiple client systems and users within an organization, as shown in FIG. 2. The entitlement management UI 132 is a graphical user interface (GUI), which is displayed on a display device 105 of the Admin IHS 130 and communicates with the entitlement management service 142 to track and manage software licenses and entitlements. In some embodiments, the entitlement management UI 132 may utilize a drag and drop feature to assign, revoke and/or transfer software licenses and entitlements to/from the client systems 110 and 120.

The entitlement management service 142 is a web portal/interface, which can be hosted in any cloud environment (e.g., Dell APEX cloud services, Amazon Web Services, Microsoft Azure, etc.). In one embodiment, the entitlement management service 142 may be stored and executed remotely on the at least one backend server 140, as shown in FIG. 2. In some embodiments, the entitlement management service 142 may use application program interfaces (APIs) to interact with cloud-based orchestration services (e.g., user authentication service 152 and/or license management service 154) and may use backend storage (e.g., entitlement database 144) and services to perform one or more steps described herein.

The at least one backend server 140 is an information handling system (or systems), which is used by an original equipment manufacturer (OEM) to track and manage software licenses and entitlements associated with a plurality of user accounts 146. When an information handling system is purchased from the OEM, a user account 146 is created (or updated) for a user during the product registration process to register and associate the purchased IHS with the user's account, along with various entitlements for licenses, services and contracts that were provided with and/or purchased for the IHS. Thus, each user account 146 may have a number of software licenses and entitlements associated therewith.

In addition to maintaining user accounts 146, the at least one backend server 140 runs the entitlement management service 142, which is used to track and manage software licenses and entitlements for information handling systems (e.g., client systems 110 and 120) purchased from the OEM. Changes to software entitlements can be made via the entitlement management UI 132 running on the Admin IHS 130 and the entitlement management service 142 running on the backend server 140. For example, if a user loses/damages their system, requests a new system or leaves the organization, an Admin may use the entitlement management UI 132 displayed on the Admin IHS 130 to update the entitlement management service 142 executed on the backend server 140 to revoke access to the software licenses and entitlements on the user's system. In some cases, the Admin may use the entitlement management UI 132 and the entitlement management service 142 to transfer software licenses and entitlements from the user's old system to a new system, a new workspace or a new user.

In the disclosed embodiments, software licenses and entitlements are linked to the user account 146 and are semi-static to the user's information handling system and workspace. As noted above, a user's workspace may include various user applications and services (e.g., the user applications 109 and cloud-based applications and services 162 included within the user's workload). In some embodiments, a user's workspace may also include various storage, backend services, and associated policies and security needed to run the user's workload. As known in the art, a user's workspace can be transferred from one information handling system to another. For example, a workspace may be configured to run within a container, which can be transferred from one system to another. By linking software licenses and entitlements to the user account 146, software licenses and entitlements can be transferred along with the user's workspace/container to a new information handling system, if the user loses/damages their system, requests a new system, brings their own system, etc. If the user's workspace is corrupted or otherwise unavailable, the disclosed embodiments may be used to transfer software licenses and entitlements to a new workspace running on the user's old system or a new system associated with the user account 146. If the user leaves the organization, or a new user is added, the disclosed embodiments may also be used to transfer software licenses and entitlements to a different user account 146.

Unlike conventional entitlement management systems and methods, which utilize a manual process to transfer software licenses and entitlements, the embodiments disclosed herein provide an automated and secure system and associated methods for transferring software licenses and entitlements from one IHS to another (such as, e.g., from the first client IHS 110 to the second client IHS 120). When a need arises to transfer software licenses and entitlements to a new IHS or a new workspace, the system and methods disclosed herein execute local validation service(s) on the new system when the new system is booted for the first time to validate the new system and the user's workspace. In some embodiments, local validation may be performed by at least one OS service 108, which is stored within the at least one computer readable storage 103 and executed by the host processing device 101 of the new system, as shown in FIGS. 2 and 4 and discussed in more detail below.

If local validation is successful, the system and methods disclosed herein may execute one or more cloud-based orchestration services remotely on the at least one orchestration server 150 to verify the user account 146 associated with the user, determine which software licenses and entitlements are assigned to the user account 146, and acquire and validate the software licenses and entitlements before the validated software licenses and entitlements are transferred to the new system. The at least one orchestration server 150 is an information handling system (or systems), which provides remote orchestration service(s) in accordance with the present disclosure. In some embodiments, the one or more cloud-based orchestration services may be stored within the at least one computer readable storage 103 and executed by the host processing device 101 of the at least one orchestration server 150, as shown in FIGS. 2 and 5 and discussed in more detail below.

Figure 3:
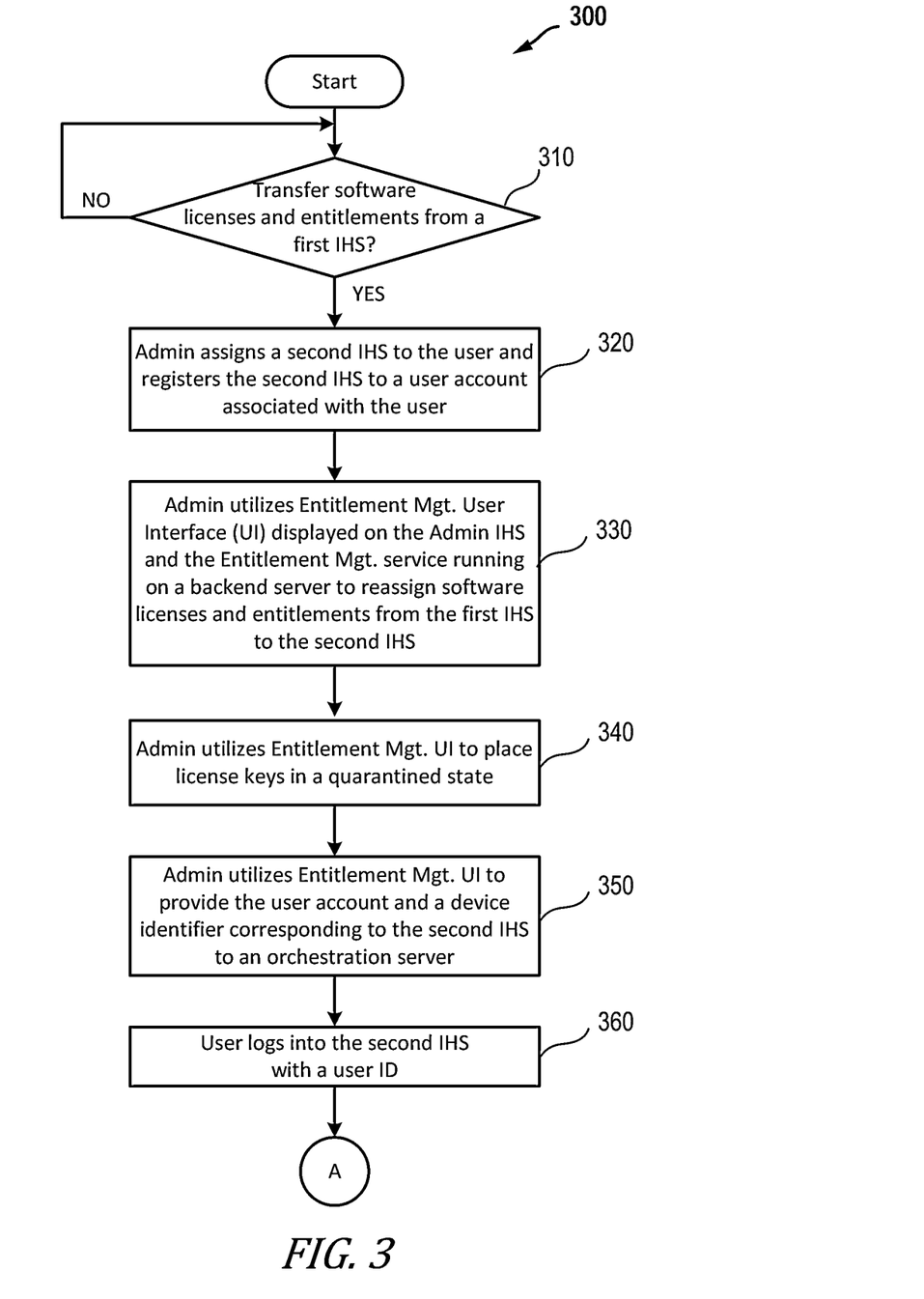
FIG. 3 is a flowchart diagram illustrating one embodiment of a method, which may be performed, at least in part, by an administrator to reassign software licenses and entitlements to a new IHS, such as the second IHS shown in FIG. 1.

Additional details for the systems and methods disclosed herein will now be described in reference to FIGS. 2-5, whereby FIG. 2 provides details of the various system components utilized to transfer software licenses and entitlements from one IHS to another; FIG. 3 illustrates example method steps performed, at least in part, by an Admin to reassign software licenses and entitlements to a new IHS; FIG. 4 illustrates example method steps performed by one or more local validation services to validate the new IHS and the user's workspace; and FIG. 5 illustrates example method steps performed by one more remote validation services to verify the user account associated with the user, determine which software licenses and entitlements are assigned to the user account, and acquire and validate the software licenses and entitlements before the validated software licenses and entitlements are transferred to the new system.

Figure 4:
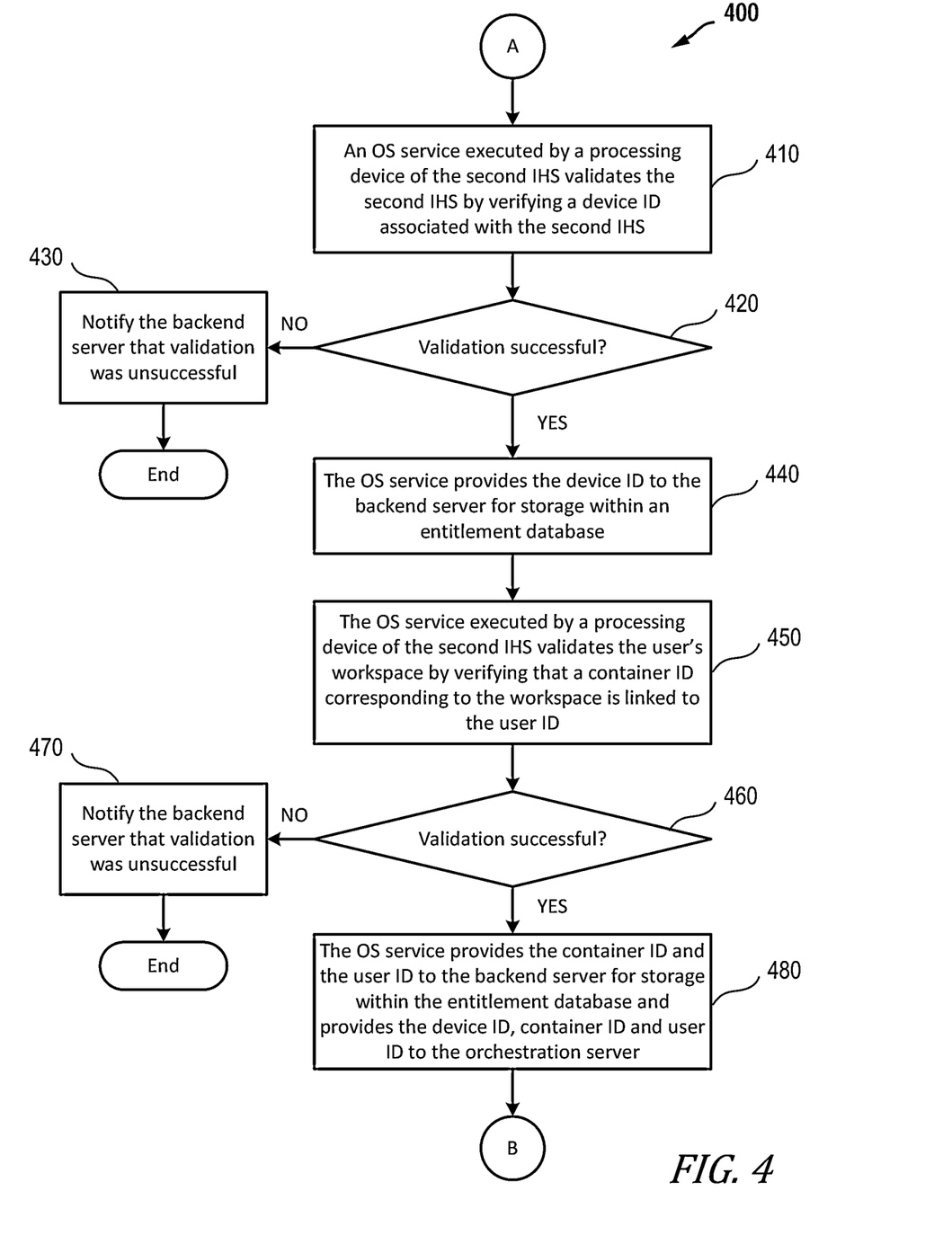
FIG. 4 is a flowchart diagram illustrating one embodiment of a computer implemented method performed by at least one operating system (OS) service, which is executed by the new IHS to validate the new IHS and the user's workspace.
Figure 5:
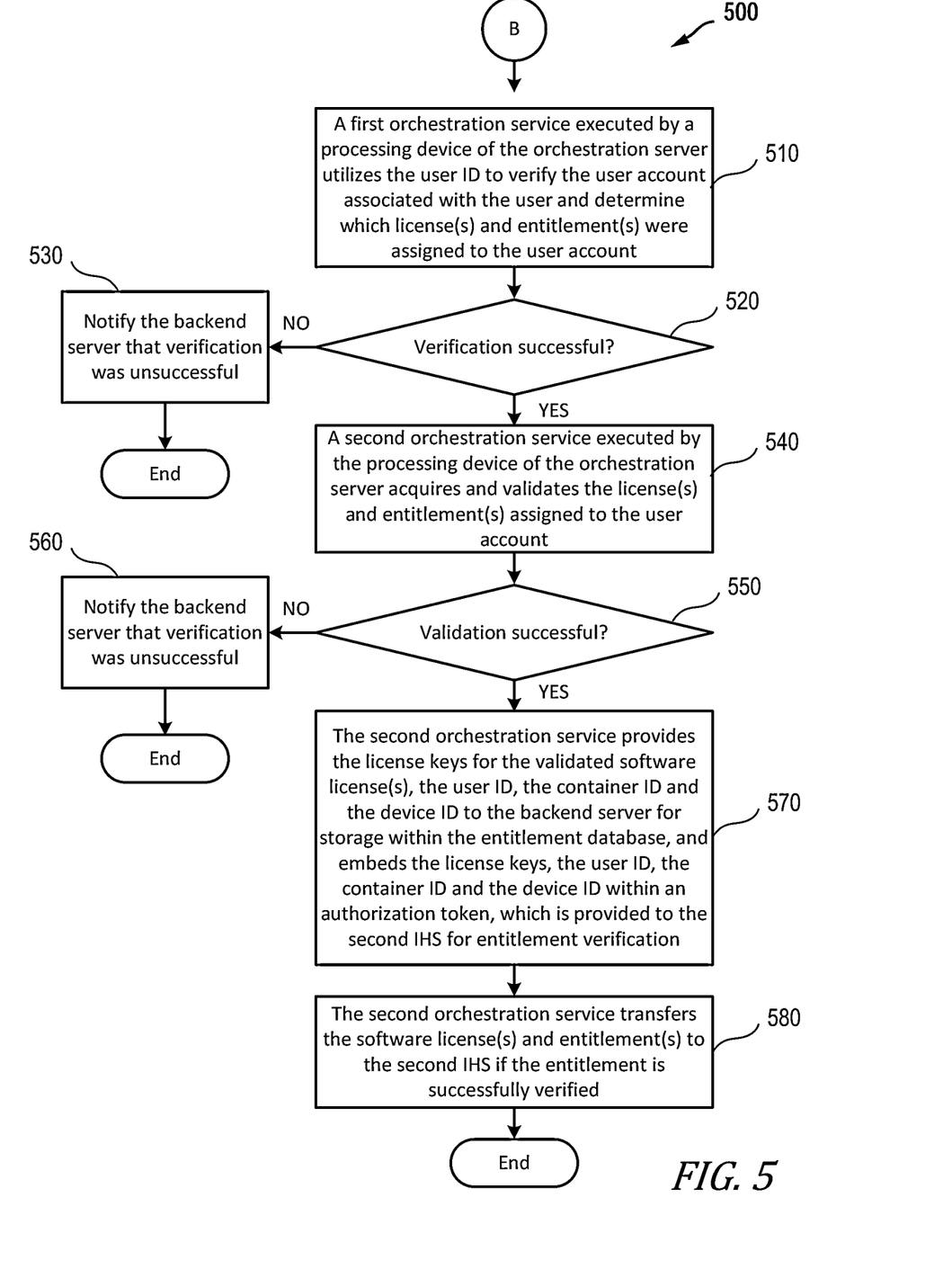
FIG. 5 is a flowchart diagram illustrating one embodiment of a computer implemented method performed by one or more cloud-based orchestration services to verify a user account associated with the user, determine the software licenses and entitlements assigned to the user account, acquire and validate the software licenses and entitlements and transfer the software licenses and entitlements to the new IHS.

It will be recognized that the embodiments shown in FIGS. 3-5 are merely exemplary and additional methods may utilize the techniques described herein. Further, additional steps may be added to the methods shown in the FIGS. 3-5, as the steps described are not intended to be exclusive. Moreover, the order of the steps is not limited to the order shown in FIGS. 3-5, as different orders may occur and/or various steps may be performed in combination or at the same time.

FIG. 3 illustrates one embodiment of a method 300 that may be performed, at least in part, by an Admin to reassign software licenses and entitlements to a new IHS. The method 300 shown in FIG. 3 may generally begin (YES branch of step 310) when a need arises to transfer software licenses and entitlements associated with a user account 146 from a first information handling system (e.g., the first client IHS 110 shown in FIG. 2) to a new system and/or to a new workspace. The first IHS may be operated by a user and may be associated with the user account 146. In some embodiments, software licenses and entitlements may need to be transferred from the first IHS to a new system (e.g., the second client IHS 120 shown in FIG. 2), if the user loses/damages the first IHS, requests a new system, brings their own system, etc. If the user's workspace is corrupted or otherwise unavailable, software licenses and entitlements may need to be transferred to a new workspace running on the first IHS, or on a new system.

If software licenses and entitlements are to be transferred to a new system (YES branch of step 310), the Admin may assign a second IHS (e.g., the second client IHS 120) to the user and register the second IHS to the user account 146 associated with the user (in step 320). Once a second IHS is assigned and registered, the Admin may use the entitlement management UI 132 displayed on the Admin IHS 130 and the entitlement management service 142 executed on the backend server 140 to reassign the software licenses and entitlements associated with the user account 146 to the second IHS (in step 330). In some cases, software licenses and entitlements may be transferred to a new workspace running on the first IHS. In such cases, step 320 may be omitted and the entitlement management UI 132 and entitlement management service 142 may alternatively be used by the Admin to reassign the software licenses and entitlements associated with the user's account 146 to a new workspace running on the first IHS (in step 330).

When software licenses and entitlements are reassigned to a new system (and/or a new workspace), the Admin may use the entitlement management UI 132 to place the license keys associated with the entitlements in a quarantined state (in step 340). Once the license keys are quarantined, the Admin may use the entitlement management UI 132 to provide the user account 146 and a device identifier ("device ID") corresponding to the second IHS to the at least one orchestration server 150 (in step 350). The second IHS may then be provided to the user. When the user logs into the second IHS for the first time, e.g., by providing a user ID and other login credentials to the second IHS (in step 360), various validation services may be executed locally on the second IHS (as shown in FIG. 4) and remotely on the at least one orchestration server 150 (as shown in FIG. 5) before the software licenses and entitlements associated with the user account 146 are transferred to the second IHS.

FIG. 4 illustrates one embodiment of a computer implemented method 400 that may be performed by the second IHS (e.g., the new system) to provide local validation services in accordance with the present disclosure. When the user logs on to the second IHS for the first time, e.g., by providing a user ID and other login credentials, validation services may be executed locally on the second IHS to validate the second IHS and the user's workspace. In some embodiments, local validation may be performed by at least one OS service 108, which is stored within the at least one computer readable storage 103 and executed by the host processing device 101 of the second IHS, as shown in FIG. 2. Although described below as a single OS service 108, one skilled in the art would understand that local validation services may be alternatively performed by one or more OS services 108.

As shown in FIG. 4, OS service 108 may be executed by the host processing device 101 of the second IHS to validate the second IHS (in step 410). In one example, the second IHS may be validated (in step 410) by verifying a device ID associated with the second IHS. The device ID may be substantially any identifier, which uniquely identifies the second IHS such as, but not limited to a device serial number. In some embodiments, the device ID may be securely stored within a digital certificate (e.g., an x509 digital certificate). By verifying the device ID, the OS service 108 identifies and validates the second IHS (e.g., the new system) to which the software licenses and entitlements are to be transferred.

If the second IHS cannot be successfully validated (NO branch of step 420), the OS service 108 may notify the at least one backend server 140 that validation was unsuccessful (in step 430) and the computer implemented method 400 shown in FIG. 4 may end. When this occurs, the license keys remain in a quarantined state until remediation can be performed for the user account 146, or entitlement is transferred to another user account.

If the second IHS is successfully validated (YES branch of step 420), the OS service 108 may provide the device ID to the at least one backend server 140 for storage within the entitlement database 144 (in step 440), and the OS service 108 may be further executed by the host processing device 101 of the second IHS to validate the user's workspace (in step 450). In one example, the user's workspace may be validated (in step 450) by verifying that a container ID corresponding to the user's workspace/container is linked to the user ID that was provided by the user at login. By verifying the container ID is linked to the user ID, the OS service 108 identifies and validates the user's workspace to which the software licenses and entitlements are to be transferred.

If the user's workspace cannot be successfully validated (NO branch of step 460), the OS service 108 may notify the at least one backend server 140 that validation was unsuccessful (in step 470) and the computer implemented method 400 shown in FIG. 4 may end. When this occurs, the license keys remain in a quarantined state until remediation can be performed for the user account 146, or entitlement is transferred to another user account.

If the user's workspace is successfully validated (YES branch of step 460), the OS service 108 may provide the container ID and the user ID to the at least one backend server 140 for storage within the entitlement database 144 (in step 480). In some embodiments, the device ID, the container ID and the user ID may be stored within the entitlement database 144 "as is," or alternatively, may be stored within the entitlement database 144 as a hash that can be later decrypted when needed. In addition, the OS service 108 may provide the device ID, the container ID and the user ID to the at least one orchestration server 150 (in step 480), so that cloud-based orchestration service(s) can be executed remotely on the at least one orchestration server 150, as shown in FIG. 5 and discussed below.

FIG. 5 illustrates one embodiment of a computer implemented method 500 that may be performed by the at least one orchestration server 150 to provide cloud-based orchestration services in accordance with the present disclosure. If the local validation shown in FIG. 4 and described above is successful, one or more cloud-based orchestration services can be executed remotely on the at least one orchestration server 150 to verify the user account 146 associated with the user, determine which software licenses and entitlements are assigned to the user account 146, and acquire and validate the software licenses and entitlements before transferring the software licenses and entitlements to the second IHS. In some embodiments, the one or more cloud-based orchestration services may be stored within the at least one computer readable storage 103 and executed by the host processing device 101 of the at least one orchestration server 150, as shown in FIG. 2. Although described below and shown in FIGS. 2 and 5 as distinct cloud-based orchestration services (e.g., user authentication service 152 and license management service 154), one skilled in the art would understand that the orchestration services described herein may be performed by one or more orchestration services, which are implemented as cloud services running in the cloud, or as backend services running in a backend server.

In some embodiments, a first orchestration service (e.g., user authentication service 152) may be executed by the host processing device 101 of the at least one orchestration server 150 to verify the user account 146 associated with the user (in step 510). In some embodiments, the first orchestration service may utilize the user ID (in step 510) to verify the user account 146 associated with the user and determine which software licenses and entitlements are assigned to the user account 146. For example, the first orchestration service may provide the user ID to the at least one backend server 140 to verify the user account 146 and obtain the software licenses and entitlements assigned to the user account 146.

If the user account 146 cannot be successfully verified (NO branch of step 520), the first orchestration service may notify the at least one backend server 140 that account verification was unsuccessful (in step 530) and the computer implemented method 500 shown in FIG. 5 may end. When this occurs, the license keys remain in a quarantined state until remediation can be performed for the user account 146, or entitlement is transferred to another user account.

If the user account 146 is successfully verified (YES branch of step 520), a second orchestration service (e.g., license management service 154) may be executed by the host processing device 101 of the at least one orchestration server 150 to acquire and validate software licenses and entitlements assigned to the user account 146 (in step 540). In some embodiments, the second orchestration service may acquire software licenses from the at least one remote server 160 shown in FIGS. 1 and 2.

The at least one remote server 160 is an information handling system (or systems), which provides applications and services 162 and associated software licenses 164 to information handling systems (e.g., client systems 110 and 120) and their users. In some embodiments, the at least one remote server 160 may be operated by a third party software vendor that provides software applications and services 162, which can be downloaded to the client system 110/120 via the network 170. In other embodiments, the at least one remote server 160 may be operated by a cloud service provider, which provides cloud-based applications and services 162, which are stored/executed remotely on the at least one remote server 160 and accessed by the client system 110/120 via the network 170. In some embodiments, the second orchestration service may acquire one or more applications and services 162 and/or software licenses 164, which are associated with the user account 146, from the at least one remote server 160 (in step 540) by communicating with the remote server 160 via the network 170.

Once all software licenses associated with the user account 146 are acquired, the second orchestration service may utilize a policy (set, e.g., by the Admin) to validate the software licenses and entitlements (in step 540). If the software licenses and entitlements cannot be successfully validated (NO branch of step 550), the second orchestration service may notify the at least one backend server 140 that account verification was unsuccessful (in step 560) and the computer implemented method 500 shown in FIG. 5 may end. When this occurs, the license keys remain in a quarantined state until remediation can be performed for the user account 146, or entitlement is transferred to another user account.

If the software licenses and entitlements are successfully validated (YES branch of step 550), the second orchestration service may provide the license keys for the validated software licenses, the user ID, the container ID and the device ID to the at least one backend server 140 for storage within the entitlement database 144, and may embed the license keys, the user ID, the container ID and the device ID within an authorization token, which may be provided the second IHS 120 for entitlement verification (in step 570). Storing the license keys, the user ID, the container ID and the device ID within the entitlement database 144 binds the authorization token to the second IHS 120 (i.e., binds the second IHS to the entitlements) and prevents other systems from using the authorization token to gain access to the software licenses and entitlements being transferred to the second IHS. In some embodiments, the authorization token may be generated (in step 570) by embedding the license keys, the user ID, the container ID and the device ID within a digital certificate (such as, e.g., an x509 certificate), which is provided to the second IHS 120 for entitlement verification. The second IHS 120 may use the digital certificate to verify the software entitlements at any time. In one example, the second IHS 120 may use the digital certificate to create a session for challenge/response between itself and an entitlement service. If the software entitlements are successfully verified with the entitlement service, the second orchestration service may transfer the software licenses and entitlements to the second IHS (in step 580).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

It will be understood that one or more of the tasks, functions, or methodologies described herein may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.). When executed on a processing device (e.g., a processor such as CPU, controller, microcontroller, microprocessor, application specific integrated circuit "ASIC," etc., or a programmable logic device "PLD," such as field programmable gate array "FPGA," complex programmable logic device "CPLD", etc.), the computer program of instructions may be configured to perform one or more steps of the methodologies disclosed herein. In one embodiment, a group of such processing devices may be selected from a group consisting of CPU, controller, microcontroller, microprocessor, FPGA, CPLD and ASIC. The computer program of instructions may include an ordered listing of executable instructions for implementing logical functions in an information handling system or a component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus, the invention is not limited to only those combinations shown herein, but rather may include other combinations.

What is claimed is:

1. A computer-implemented method for transferring software licenses and entitlements associated with a given user account associated with a given user of a first information handling system from the first information handling system (IHS) to a second IHS, the computer-implemented method comprising registering the second IHS to the given user account associated with the given user; and then:
    executing an entitlement management service to reassign the software licenses and entitlements associated with the given user account from the first IHS to the second IHS;
    executing at least one local validation service on the second IHS when the given user logs on to the second IHS for the first time to validate the second IHS and a workspace of the given user on the second IHS; and
    executing one or more cloud-based orchestration services only if the second IHS and the workspace of the given user is successfully validated by the at least one local validation service, wherein the one or more cloud-based orchestration services are executed to verify the given user account of the given user on the second IHS, determine which software licenses and entitlements are associated with the given user account, acquire and validate all the software licenses and entitlements associated with the given user account, and transfer the acquired software licenses and entitlements from the first information handling system to the second IHS only if the given user account is successfully verified and the software licenses and entitlements are successfully validated by the one or more cloud-based orchestration services;
    where each of the transferred software licenses grants the rights to use a given software product and defines how the given software product may be used, and where each of the transferred software entitlements assigns the rights of a transferred software license.

2. The computer-implemented method of claim 1, wherein executing the at least one local validation service comprises verifying a device ID associated with the second IHS to validate the second IHS.

3. The computer-implemented method of claim 1, wherein the given user of the second IHS logs on to the second IHS the first time by providing a user ID of the given user to the second IHS, and wherein executing the at least one local validation service comprises verifying that a container ID corresponding to the given user's workspace is linked to the user ID of the given user to validate the given user's workspace.

4. The computer-implemented method of claim 3, wherein executing the one or more cloud-based orchestration services comprises utilizing the user ID of the given user to verify the given user account and determine which software licenses and entitlements are associated with the given user account.

5. The computer-implemented method of claim 1, further comprising executing the entitlement management service to place license keys associated with the software licenses and entitlements in a quarantined state before the software licenses and entitlements associated with the given user account are transferred to the second IHS and prior to executing the at least one local validation service.

6. The computer-implemented method of claim 5, wherein if the second IHS and the given user's workspace is successfully validated by the at least one local validation service, the at least one local validation service is further executed to provide a device ID associated with the second IHS, a user ID corresponding to the given user and a container ID corresponding to the given user's workspace to the one or more cloud-based orchestration services.

7. The computer-implemented method of claim 6, where if the given user account is successfully verified and the software licenses and entitlements are successfully validated by the one or more cloud-based orchestration services, the one or more cloud-based orchestration services are further executed to embed the license keys, the device ID, the user ID of the given user and the container ID within an authorization token.

8. The computer-implemented method of claim 7, wherein executing the one or more cloud-based orchestration services further comprises providing the authorization token to the second IHS for entitlement verification.

9. The computer-implemented method of claim 8, further comprising using the authorization token to verify entitlement before transferring the software licenses and entitlements to the second IHS.

10. The computer-implemented method of claim 1, further comprising binding the entitlements associated with the given user account to the second IHS and preventing other information handling systems from gaining access to the software licenses and entitlements transferred to the second IHS.

11. The computer-implemented method of claim 1, further comprising performing the method of claim 1 to automatically transfer the software licenses and entitlements associated with the given user account associated with the given user of the first information handling system from the first information handling system (IHS) to the second IHS when the given user loses or damages their system, or if the given user's workspace is corrupted.

12. The computer-implemented method of claim 1, where the executing the at least one local validation service on the second IHS when the given user logs on to the second IHS for the first time comprises automatically executing the at least one validation service on the second IHS when the second information handling system is booted for the first time to validate the second information handling system and the given user's workspace on the second IHS.

13. A system for transferring software licenses and entitlements associated with a given user account associated with a given user of a first information handling system from the first information handling system (IHS) to a second IHS, the system comprising:
- an administrator IHS having a first processing device, which is configured to register the second IHS to the given user account associated with the given user and to execute an entitlement management service to reassign the software licenses and entitlements associated with the given user account from the first IHS to the second IHS;
- the second IHS having a computer readable storage device for storing an operating system (OS) and at least one OS service and a second processing device for executing the at least one OS service when the given user logs on to the second IHS for the first time to validate the second IHS and a workspace of the given user on the second IHS; and
- an orchestration server having a computer readable storage device for storing one or more cloud-based orchestration services and a third processing device for executing the one or more cloud-based orchestration services only if the second IHS and the workspace of the given user is successfully validated by the at least one local validation service, wherein the one or more cloud-based orchestration services are executed by the third processing device to verify the given user account of the given user on the second IHS, determine which software licenses and entitlements are associated with the given user account, acquire and validate all the software licenses and entitlements associated with the given user account, and transfer the acquired software licenses and entitlements from the first information handling system to the second IHS only if the given user account is successfully verified and the software licenses and entitlements are successfully validated by the one or more cloud-based orchestration services;
- where each of the transferred software licenses grants the rights to use a given software product and defines how the given software product may be used, and where each of the transferred software entitlements assigns the rights of a transferred software license; and
- wherein the administrator IHS, the second IHS and the orchestration server are communicatively coupled via a network.

14. The system of claim 13, wherein the at least one OS service executed by the second processing device validates the second IHS by verifying a device ID associated with the second IHS.

15. The system of claim 13, wherein the given user of the second IHS logs on to the second IHS for the first time by providing a user ID of the given user to the second IHS, and wherein the at least one OS service executed by the second processing device validates the given user's workspace by verifying that a container ID corresponding to the given user's workspace is linked to the user ID of the given user.

16. The system of claim 15, wherein the one or more cloud-based orchestration services executed by the third processing device utilize the user ID of the given user to verify the given user account and determine which software licenses and entitlements are associated with the given user account.

17. The system of claim 13, wherein the entitlement management service is further executed by the first processing device to place license keys associated with the software licenses and entitlements in a quarantined state before the software licenses and entitlements associated with the given user account are transferred to the second IHS and before the second processing device executes the at least one OS service.

18. The system of claim 17, wherein if the at least one OS service successfully validates the second IHS and the given user's workspace, the at least one OS service is further executed by the second processing device to provide a device ID associated with the second IHS, a user ID corresponding to the given user and a container ID corresponding to the given user's workspace to the one or more cloud-based orchestration services.

19. The system of claim 18, where if the given user account is successfully verified and the software licenses and entitlements are successfully validated by the one or more cloud-based orchestration services, the one or more cloud-based orchestration services are further executed by the third processing device to embed the license keys, the device ID, the user ID of the given user and the container ID within an authorization token.

20. The system of claim 19, wherein the one or more cloud-based orchestration services are further executed by the third processing device to provide the authorization token to the second IHS for entitlement verification.

21. The system of claim 20, wherein the second IHS utilizes the authorization token to verify entitlement with an entitlement service before the one or more cloud-based orchestration services transfer the software licenses and entitlements to the second IHS.

22. The system of claim 13, further comprising a backend server communicatively coupled to the administrator IHS, the second IHS and the orchestration server via the network;
- where the backend server is configured to bind the entitlements associated with the given user account to the second IHS and prevent other information handling systems from gaining access to the software licenses and entitlements transferred to the second IHS.

23. The system of claim 13, where the system automatically transfers the software licenses and entitlements associated with the given user account associated with the given user of the first information handling system from the first information handling system (IHS) to the second IHS when the given user loses or damages their system, or if the given user's workspace is corrupted.

24. The system of claim 13, where the second processing device of the second IHS automatically executes the OS service on the second IHS when the given user logs on to the second IHS for the first time when the second information handling system is booted for the first time to validate the second IHS and the given user's workspace on the second IHS.

25. A system for transferring software licenses and entitlements associated with a user account from a first information handling system (IHS) to a second IHS, the system comprising:
- an administrator IHS having a first processing device, which is configured to execute an entitlement management service to reassign the software licenses and entitlements associated with the user account to the second IHS;

the second IHS having a computer readable storage device for storing an operating system (OS) and at least one OS service and a second processing device for executing the at least one OS service when a user of the second IHS logs on to the second IHS for the first time to validate the second IHS and the user's workspace; and an orchestration server having a computer readable storage device for storing one or more cloud-based orchestration services and a third processing device for executing the one or more cloud-based orchestration services only if the second IHS and the user's workspace is successfully validated by the at least one local validation service, wherein the one or more cloud-based orchestration services are executed by the third processing device to verify the user account, determine which software licenses and entitlements are associated with the user account, acquire and validate the software licenses and entitlements, and transfer the software licenses and entitlements to the second IHS only if the user account is successfully verified and the software licenses and entitlements are successfully validated by the one or more cloud-based orchestration services; and wherein the administrator IHS, the second IHS and the orchestration server are communicatively coupled via a network;

wherein the entitlement management service is further executed by the first processing device to place license keys associated with the software licenses and entitlements in a quarantined state before the second processing device executes the at least one OS service;

wherein if the at least one OS service successfully validates the second IHS and the user's workspace, the at least one OS service is further executed by the second processing device to provide a device ID associated with the second IHS, a user ID corresponding to the user and a container ID corresponding to the user's workspace to the one or more cloud-based orchestration services;

where if the user account is successfully verified and the software licenses and entitlements are successfully validated by the one or more cloud-based orchestration services, the one or more cloud-based orchestration services are further executed by the third processing device to embed the license keys, the device ID, the user ID and the container ID within an authorization token;

wherein the one or more cloud-based orchestration services are further executed by the third processing device to provide the authorization token to the second IHS for entitlement verification;

wherein the second IHS utilizes the authorization token to verify entitlement with an entitlement service before the one or more cloud-based orchestration services transfer the software licenses and entitlements to the second IHS; and where the system further comprises a backend server communicatively coupled to the administrator IHS, the second IHS and the orchestration server via the network, wherein the at least one OS service is executed by the second processing device to provide the device ID, the user ID and the container ID to the backend server for storage within an entitlement database contained within the backend server, wherein the one or more cloud-based orchestration services are executed by the third processing device to provide the license keys, the device ID, the user ID and the container ID to the backend server for storage within the entitlement database, and wherein storing the license keys, the device ID, the user ID and the container ID within the entitlement database binds the entitlements to the second IHS and prevents other information handling systems from using the authorization token to gain access to the software licenses and entitlements transferred to the second IHS.

26. A computer-implemented method for transferring software licenses and entitlements associated with a user account from a first information handling system (IHS) to a second IHS, the computer-implemented method comprising:

executing an entitlement management service to reassign the software licenses and entitlements associated with the user account to the second IHS;

executing at least one local validation service on the second IHS when a user of the second IHS logs on to the second IHS for the first time, wherein the at least one local validation service is executed to validate the second IHS and the user's workspace;

executing one or more cloud-based orchestration services only if the second IHS and the user's workspace is successfully validated by the at least one local validation service, wherein the one or more cloud-based orchestration services are executed to verify the user account, determine which software licenses and entitlements are associated with the user account, acquire and validate the software licenses and entitlements, and transfer the software licenses and entitlements to the second IHS only if the user account is successfully verified and the software licenses and entitlements are successfully validated by the one or more cloud-based orchestration services;

executing the entitlement management service to place license keys associated with the software licenses and entitlements in a quarantined state prior to executing the at least one local validation service;

wherein if the second IHS and the user's workspace is successfully validated by the at least one local validation service, the at least one local validation service is further executed to provide a device ID associated with the second IHS, a user ID corresponding to the user and a container ID corresponding to the user's workspace to the one or more cloud-based orchestration services;

where if the user account is successfully verified and the software licenses and entitlements are successfully validated by the one or more cloud-based orchestration services, the one or more cloud-based orchestration services are further executed to embed the license keys, the device ID, the user ID and the container ID within an authorization token;

wherein executing the one or more cloud-based orchestration services further comprises providing the authorization token to the second IHS for entitlement verification;

where the computer-implemented method further comprises using the authorization token to verify entitlement before transferring the software licenses and entitlements to the second IHS; and where the at least one validation service is executed to provide the device ID, the user ID and the container ID to a backend server for storage within an entitlement database contained within the backend server, wherein the one or more cloud-based orchestration services are executed to provide the license keys, the device ID, the user ID and the container ID to the backend server for storage within the entitlement database, and wherein storing the license keys, the device ID, the user ID and the container ID within the entitlement database binds the entitlements to the second IHS and prevents other information handling systems from using the authorization token to gain access to the software licenses and entitlements transferred to the second IHS.

\* \* \* \* \*